Patented Dec. 30, 1930

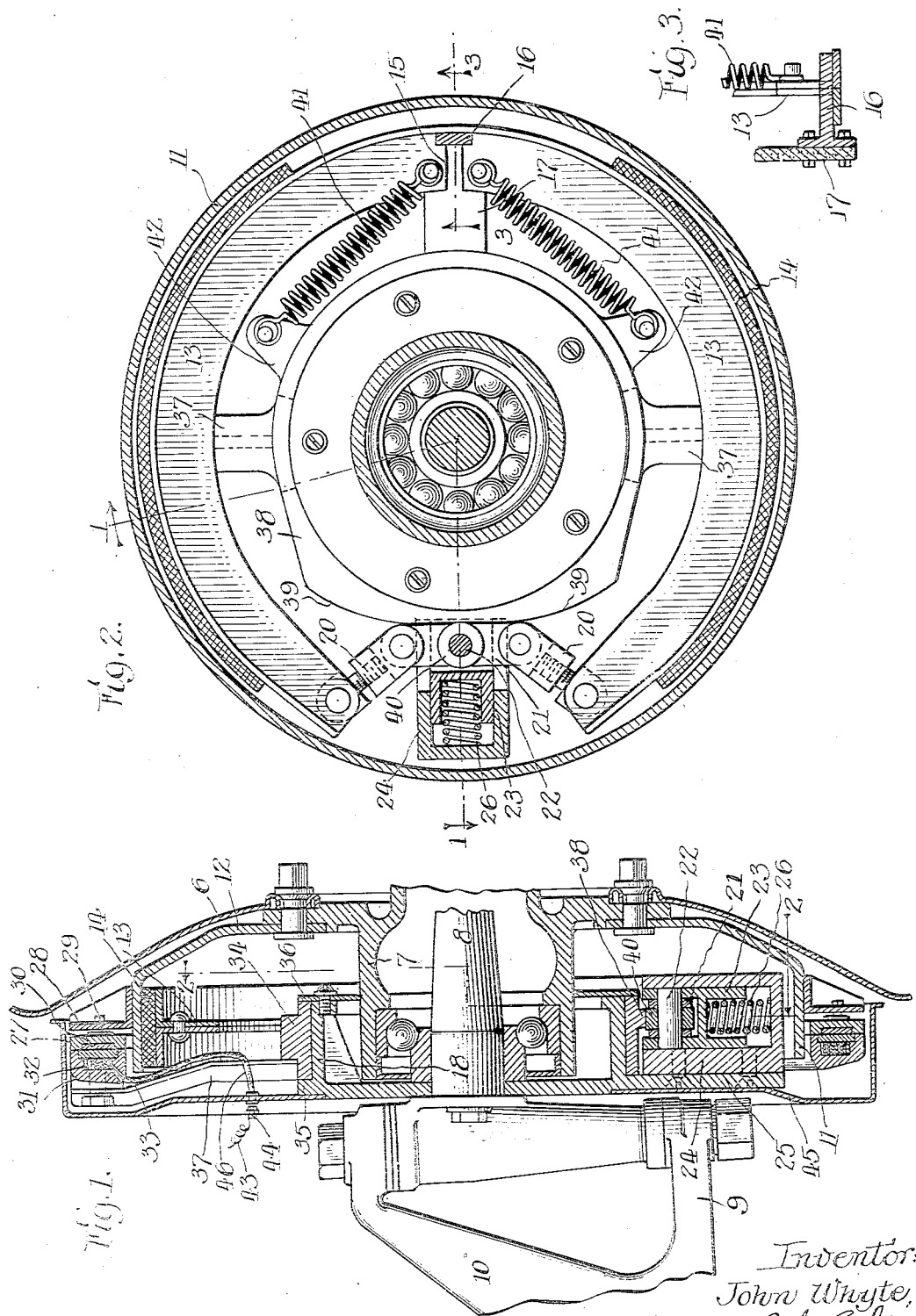

1,786,808

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed July 13, 1928. Serial No. 292,335.

This invention relates to improvements in brakes and more particularly to friction brakes of the so-called momentum type wherein a pair of coacting friction elements are adapted, when brought into gripping engagement, to derive an actuating force from the motion or momentum of a part to be braked, this force being augmented mechanically and applied to a friction brake associated with said part.

One object of the present invention is to provide an electromagnetic controlled brake of the above class which is simple and inexpensive in construction and particularly adapted for use on both front or rear wheels of the lighter weight passenger automobiles.

Another object is to provide a friction brake of the momentum type having a novel means by which the force derived through the gripping of two axially engageable friction elements is augmented mechanically and applied to a friction braking means associated with a rotatable drum.

Other objects and advantages of the invention will become apparent from the following detailed description taken in connection with the accompanying drawings in which:

Figure 1 is a fragmentary view of a front wheel assembly equipped with a brake embodying the features of the present invention, the brake being shown as a section taken along the plane of the line 1—1 of Fig. 2.

Fig. 2 is a sectional view of the brake proper taken along the line 2—2 of Fig. 1.

Fig. 3 is a detail section along the line 3—3 of Fig. 2.

Although the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

In its exemplary form illustrated in the drawings, the invention is embodied in a brake for a vehicle wheel 6 of the disk type. The wheel is associated with a front axle assembly being carried by a hub 7 mounted through the usual bearings on the spindle 8 of a steering knuckle 9 which is pivoted on the end of the front axle 10.

The friction brake herein employed for arresting the motion of the wheel is of the expansible type including a drum 11 supported in the plane of rotation of the wheel as by bolting its end flange 12 to a flange on the wheel hub 7.

In the present instance the relatively stationary element of the brake comprises a pair of shoes 13 substantially semi-circular in form and arranged in end to end relation within the drum. The shoes provide a rigid backing for a covering 14 of friction material secured thereto and may be cheaply formed by riveting together the flanges of two angle bars of lengths equal to the combined lengths of the two shoes. Intermediate their ends the flanges of the bars are slotted, as indicated at 15, to receive a bar 16 suitably secured to the backing portion of the shoes (Fig. 3) and rigidly attached to an arm 17 projecting radially from an anchoring hub 18. The latter is received on the axle adjacent the steering knuckle to which it is secured as by bolts and thus held against rotation.

The shoes extend circumferentially around the internal drum surface with their adjacent ends spaced apart so as to leave a gap on one side of the drum in which is mounted an expanding means by which said ends may spread apart to press the coverings 14 against the drum. This means is in the form of a toggle comprising a pair of longitudinally adjustable links 20 pivotally connected at one of their ends to the adjacent ends of the respective brake shoes 13.

The other ends of the toggle links are received between the ends of and pivotally connected to a pair of spaced bars 21 mounted for radial reciprocation to flex the toggle. For this purpose, the bars 21 are pivotally mounted intermediate their ends on a pin 22 carried on the bifurcated end of a block 23 which is slidable in an inwardly opening guideway formed by a member 24. This member is secured by screws in radial position on an arm 25 projecting from the hub 18 and is slotted at its inner end to allow for bodily radial movement of the bars 21. A coiled compression spring 26 acts between the block and closed end of the member 24 to urge the block inwardly, thereby tending to flex the toggle links in a direction to move the adjacent end portions of the shoes 13 together thereby releasing the brake.

A pair of electromagnetically controlled friction elements are provided to derive an actuating force from the momentum of the vehicle for actuating the toggle to apply the brake. One of these elements constitutes a magnet armature and presents a rotating friction surface facing inwardly from the wheel. This element is in the form of a ring 27 of magnetic material encircling the drum 11 and supported externally of and a substantial distance from the open end of the drum. To this end, the drum carries a flange 28 to which are secured at spaced points around its inner face the ends of a plurality of flat strips 29 of resilient metal. Each strip extends substantially in tangential direction and is secured at its other end to the back of the ring 27. Thus the ring is supported from the flange 28 for yielding axial movement, the springs 29 being stressed so as to urge the ring away from the flange. To reduce wear, plates 30 of wear-resisting material are set in the ring 27 presenting a friction surface substantially flush with the inwardly facing surface of the ring.

The magnet constitutes the driven element of the momentum operator and in the form illustrated comprises a ring 31 of substantially U-shaped cross section and of the same diameter as the ring 27. A winding 32 comprising a series of turns of insulated wire wound in the form of an annulus is disposed in an annular groove defined by the concentric flange portions of the ring 28. Wear plates 33 of non-magnetic material are secured to the magnet ring with their opposite edges seated on annular shoulders formed in the flanges of the ring.

The end surfaces of the concentric ring flanges constitute magnetic pole faces which, it will be observed, are disposed opposite the corresponding surfaces of the ring 27 through which a magnetic flux flows upon the energization of the winding 32. The springs 29 resiliently urge the armature ring 27 toward the magnet ring and thus maintain intimate mechanical contact at all times between the wear plates of the two elements, thereby maintaining a flux path through the armature and the magnet core which is substantially closed at all times around the entire periphery of the magnet.

To support the magnet ring 31 opposite the armature for oscillatory movement about the drum axis, a spider is employed having a hub portion 34 rotatably mounted between flanges 35 and 36 on the outer peripheral surface of the hub 18 and two radial arms 37 projecting from diametrically opposite sides of the hub portion. These arms are secured at their outer edges as by screws to the back of the magnet ring 31.

The frictional force rendered available by the gripping engagement of the rings 27 and 31 when the winding 32 is energized is applied to the toggle to move the same outwardly regardless of the direction of angular movement of the driven friction element. For this purpose, a circumferentially movable cam 38 is provided in the form of plates rigid with the hub 34 and having inwardly converging surfaces 39 engaged by an antifriction roller 40 mounted on the pin 22 between the bars 21 of the toggle. When the brake is in released position, as shown in Fig. 2, the roller 40 is disposed in its inward position at the point of convergence of the cam surfaces and is moved outwardly to set the brake by one of said surfaces in the rotation of the hub 34 in either direction away from its normal brake-released position shown in Fig. 2.

It will be apparent that the arms 37, the cam 38 and the toggle constitute a powerful mechanism for augmenting and applying to the brake shoes the frictional force derived at a substantial distance from the axis of the brake drum by the gripping engagement of the rings 27 and 31. Because of the magnitude of the force which may be derived through such an operator, the toggle links may be arranged to form a fairly sharp angle with each other even when in their brake-setting position. While such an arrangement does not take advantage of the powerful augmentation which may be effected through a toggle mechanism by moving the links substantially into alinement, it does provide a sufficient leverage to effect the desired degree of braking action in the present instance when coupled with the increased mechanical advantage which may be accomplished through the use of the cam 38, and the actuation thereof from a point disposed remotely from the drum axis. Such arrangement of the toggle links avoids the danger of locking the vehicle wheels by movement of the toggle links substantially into alinement, which has heretofore been a detrimental characteristic of toggle operators. The toggle mechanism may be formed is relatively narrow radial widths so that the momentum operator thus provided may be incorporated advantageously in the front wheel assembly of an automobile where the steering knuckle must be located close to the plane of rotation of the wheel.

Means is provided acting independently of the toggle mechanism for maintaining the driven friction element and the cam 38 in brake-released position. This means comprises a pair of tension springs 41 each anchored at one of their ends on one of the brake shoes 13 and connected at their other ends to lugs 42 projecting radially outward from the hub 34. In the oscillation of the hub in either direction away from its normal brake-released position, one of the springs 41 is extended so that when the magnet is deenergized, this spring will move the hub back to brake released position during which the surface of the active cam 38 allows the compression spring 26 to flex the toggle inwardly thereby releasing the brake.

Current for energizing the magnet may be supplied from a storage battery to the winding 32 through a grounded conductor including the vehicle frame and an insulated conductor 43 connected to a binding post 44 carried by and insulated from an annular plate 45 mounted at its inner edge on the hub 18 and having an outwardly projecting flange at its outer edge which overlies the magnet structure. Thus the magnetic elements and all of the parts of the momentum operator are completely enclosed and protected. The inner end of the post 44 is connected to one end of a flexible conductor 46 leading to the insulated end of the winding 32 and extending along the arm 37 so as to allow for the required oscillation of the magnet in either direction from brake-released position. At its opposite end this conductor is connected to the insulated terminal end of the magnetic winding 32. Any suitable means such as a rheostat may be employed for controlling the degree of energization of the winding and therefore the degree of braking action obtained upon oscillation of the magnet.

I claim as my invention:

1. An electric brake of the momentum type comprising, in combination, a drum rotatable with a part to be braked, braking means within said drum, a toggle associated with said braking means near the periphery of said drum, a pair of annular friction elements arranged for axial gripping engagement upon the energization of a winding magnet carried by one of them, one element being rotatable with said drum, the other being mounted for oscillatory movement about the drum axis, and means rigid with said oscillatory element and operable in either direction of movement thereof away from the normal brake-released position to flex said toggle in a direction to expand said braking means and thereby set the brake.

2. A momentum brake comprising, in combination, a rotatable drum having an internal braking surface, friction means for engaging said surface, expansible means for pressing said friction means against said surface having adjacent separable end portions, means for spreading said end portions apart to set the brake comprising a pair of toggle links connected respectively at one of their ends to said end portions and a member connected to the other ends of said toggle links and guided for radial movement, means disposed externally of and carried by said drum and providing an annular friction surface, a substantially rigid friction ring adapted for axial gripping engagement with said annular surface, and means for imparting the angular movement of said ring to said radially movable member comprising a cam having converging surfaces each operable in one direction of movement of said ring to move said member away from normal brake-released position.

3. A momentum brake having, in combination, a rotatable drum, expansible braking means within said drum having adjacent end portions spaced apart to leave a gap on one side of said drum, a member mounted in said gap and guided for radial movement, toggle links connecting said member and said end portions, means providing a pair of circumferentially movable cam surfaces operable upon movement in opposite directions away from a normal brake-released position to move said member outwardly and thereby increase the angle between said toggle links, and means operable to derive an actuating force from the motion of said drum to move said surfaces angularly in either direction depending on the direction of rotation of said drum.

4. A momentum brake comprising, in combination, a rotatable drum, expansible braking means within said drum having adjacent end portions adapted to be spread apart in the setting of said brake, a member guided for movement radially of said drum, links connecting said member with said end portions, a pair of annular friction elements adapted for axial gripping engagement, one being rotatable with said drum, the other mounted for oscillation about the drum axis, and means tending to straighten said links in the movement of said oscillatory member in either direction away from a normal brake-released position.

5. A momentum brake comprising, in combination, a rotatable drum, braking means engageable therewith, a toggle for expanding said braking means against said drum including a pair of links and a radially movable member connecting said links, means adapted to derive an actuating force from the motion of said drum regardless of the direction of such motion, mechanism for applying the force thus derived to flex said toggle in a direction to set said brake, spring means acting on the parts of said toggle for flexing the toggle in a direction to release the brake, and independent spring means operable upon said mechanism to move the same to brake-released position after movement in either direction away from such position in the setting of the brake.

6. A friction brake comprising, in combination, a rotatable drum, friction means within said drum having adjacent separable end portions spaced apart to define a gap on one side of the drum, a pair of links each connected at one end to one of said end portions, a member connecting the other ends of said links, means disposed in said gap immediately within said drum and guiding said member for radial movement, a spring acting in compression upon said member to move it away from said drum, and means for moving said member outwardly against the action of said spring whereby to set the brake.

7. A friction brake comprising, in combination, a rotatable drum, friction means within said drum having adjacent separable end portions spaced apart to define a gap on one side of the drum, a pair of links each connected at one end to one of said end portions, a member connecting the other ends of said links, means disposed in said gap immediately within said drum and guiding said member for radial movement, a spring acting upon said member to move it away from said drum, and means for moving said member outwardly against the action of said spring whereby to set the brake comprising a cam movable in opposite directions away from a normal brake-released position and having surfaces for actuating the member regardless of the direction of movement of the cam.

8. A brake of the momentum type combining rotatable means providing an internal cylindrical surface, friction braking means extending around said surface and having adjacent end portions spaced apart on one side of said surface and adapted for relative movement to apply the braking means to said surface, means mounted between the ends of said braking means and providing a radially extending guideway, a member reciprocable in said guideway, and a pair of links each having one end connected to said member and the other end connected to one end of said braking means, said links and said member forming a toggle which is straightened to apply said braking means by movement of said member outwardly toward said surface and flexed to release the braking member by movement thereof toward the rotational axis of said surface.

9. A brake of the momentum type combining rotatable means providing an internal cylindrical surface, friction braking means extending around said surface and having adjacent ends arranged for relative movement to press said braking means into gripping engagement with said surface, a toggle mechanism associated with said ends and arranged for movement in a plane perpendicular to the rotational axis of said surface, a pair of coacting friction elements, one rotatable with said surface, the other being mounted for angular movement about the rotational axis of said surface, said elements being adapted for axial gripping engagement and in such engagement to derive an actuating force from the momentum of the part to be braked, and means associated with said driven element and operable to apply the actuating force thus derived to said toggle mechanism as a radially directed pressure.

10. A brake of the momentum type combining rotatable means providing an internal cylindrical surface, expansible braking means extending around said surface and having adjacent separable end portions arranged for relative movement to effect application of the brake, a pair of toggle links having their remote ends connected respectively to the ends of said braking means and their other ends connected together and arranged to be moved away from the rotational axis of said surface to straighten the toggle and thereby expand said braking means and to be moved toward said axis to flex the toggle and thereby release said braking means.

In testimony whereof, I have hereunto affixed my signature.

JOHN WHYTE.